June 20, 1972 W. D. HUFFAKER 3,671,079

METHOD AND APPARATUS FOR HANDLING MATERIAL

Filed April 16, 1970 2 Sheets-Sheet 1

INVENTOR.
WALTER D. HUFFAKER

BY *Robert Cervera*

ATTORNEY.

United States Patent Office 3,671,079
Patented June 20, 1972

3,671,079
METHOD AND APPARATUS FOR HANDLING MATERIAL
Walter D. Huffaker, Kodak, Tenn., assignor to Ma-Tran Corporation, Knoxville, Tenn.
Filed Apr. 16, 1970, Ser. No. 29,005
Int. Cl. B65g 53/16, 53/36
U.S. Cl. 302—29     8 Claims

ABSTRACT OF THE DISCLOSURE

A fluidizer receives material from a source. After the fluidizer is filled with material, the material therein is aerated. Then, the material is conveyed to a storage tank by pressurized air. The material in the lower portion of the storage tank is aerated whenever material is to be delivered from the storage tank.

In material handling apparatus in which material is transported or conveyed from a storage tank or container to a mixing or weighing hopper or the like, it has previously been suggested to fill the storage tank or container from a pressurized container on a truck, railroad car, or the like. When this type of truck or railroad car is available, a closed system may be employed for filling the storage tank or container from the container on the truck or railroad car since the pressure source can convey the material to the storage tank or container.

However, all trucks or railroad cars do not have a pressure source. Therefore, a problem has existed in which material can be economically transported from a non-pressurized container on a truck or railroad car to the storage tank or container.

The present invention satisfactorily solves the foregoing problem by employing a fluidizer that may readily receive material from a container on a truck or railroad car, for example, by gravity flow and then pneumatically convey the material to the storage tank or container. Thus, by utilizing the present invention, the fluidizer may be disposed in a pit beneath the rails upon which a railroad car may be disposed, for example, so that the material can flow by gravity from a container on the railroad car into the fluidizer. Through the use of automatic or manual controls, the supply to the fluidizer may be stopped when the material in the fluidizer reaches a predetermined level. When this occurs, the material in the fluidizer is aerated and then conveyed to the storage tank or container from the fluidizer before any additional material can be received by the fluidizer from the container on the railroad car.

Thus, the present invention insures that only a predetermined quantity of the material is handled at any particular time for transport from the fluidizer to the storage tank or container. This insures that the quantity is not so great that it cannot be handled by the connecting line between the fluidizer and the storage tank or container.

Furthermore, by using the apparatus of the present invention, a connection can be made to the fluidizer from the container on the railroad car, for example, whereby there will be no pollution of the air in any significant amount due to flow of the material from the container on the railroad car to the fluidizer. Additionally, by employing the present invention, the material is conveyed from the fluidizer to the storage tank or container without any contamination of the conveying line.

The present invention also has utility with dust collectors since it can be employed as a scavenger system. Thus, the dust collector could be connected to the fluidizer so that the particles collected by the dust collector could be directed to the fluidizer; then, when the fluidizer had a predetermined level of the collected particles therein, the particles could be conveyed to a storage tank or container or returned to the apparatus with which the dust collector is employed for further processing. Thus, the fluidizer of the present invention enables material to be conveyed from the fluidizer to the storage container or tank without any communication of the particles with the atmosphere since the storage tank or container is maintained at a lower pressure than the fluidizer during transport of the particles from the fluidizer to the storage tank or container.

By employing the fluidizer of the present invention in conjunction with a storage tank or container, a dense aerated mass of material is formed within the fluidizer before it is transported to the storage tank or container, for example. This dense aerated mass allows a gas of low velocity to be employed to convey the material from the fluidizer to the storage tank or container in a relatively short period because of the high density.

In one embodiment of the present invention, the storage tank or container is aerated whenever material is to be supplied therefrom. Pressurized air is supplied to the lower portion of the storage tank or container to aerate the material therein when the material is delivered therefrom.

In another embodiment of the invention, the outlet of the storage tank or container is connected to a second fluidizer which is pressurized when empty. Then, when material is to be supplied from the storage tank or container to the second fluidizer, the pressurized gas within the fluidizer is supplied to the lower portion of the storage tank or container to aerate the material therein. When the material reaches a predetermined level in the second fluidizer, flow of the material from the storage tank or container is stopped, and the material in the second fluidizer is aerated. This insures additional aeration of the material after it leaves the storage tank or container and before it is supplied to a mixing hopper, for example.

Since the fluidizer, which supplies the material to the storage tank or container, can be disconnected therefrom when desired, it is not necessary to continuously maintain the fluidizer or the storage tank or container under pressure. It is only necessary that this be accomplished whenever the fluidizer is supplying the material to the storage tank or container.

Since the storage tank or container relies upon gas pressure from the second fluidizer, which receives the material from the storage tank or container, when the second fluidizer is employed, it is not necessary to pressurize the storage tank or container in this embodiment when it is receiving material from the first fluidizer. Thus, in this modification, the first fluidizer can be operated at a lower pressure than when the second fluidizer is not employed.

An object of this invention is to provide a closed material handling system.

Another object of this invention is to provide a material handling apparatus in which material may be supplied to a storage tank from a non-pressurized external source.

A further object of this invention is to provide a method and apparatus for handling material in which the material is aerated.

Other objects of this invention will be readily perceived from the following description, claims, and drawings.

The attached drawings illustrate preferred embodiments of the invention, in which.

Figure 1:
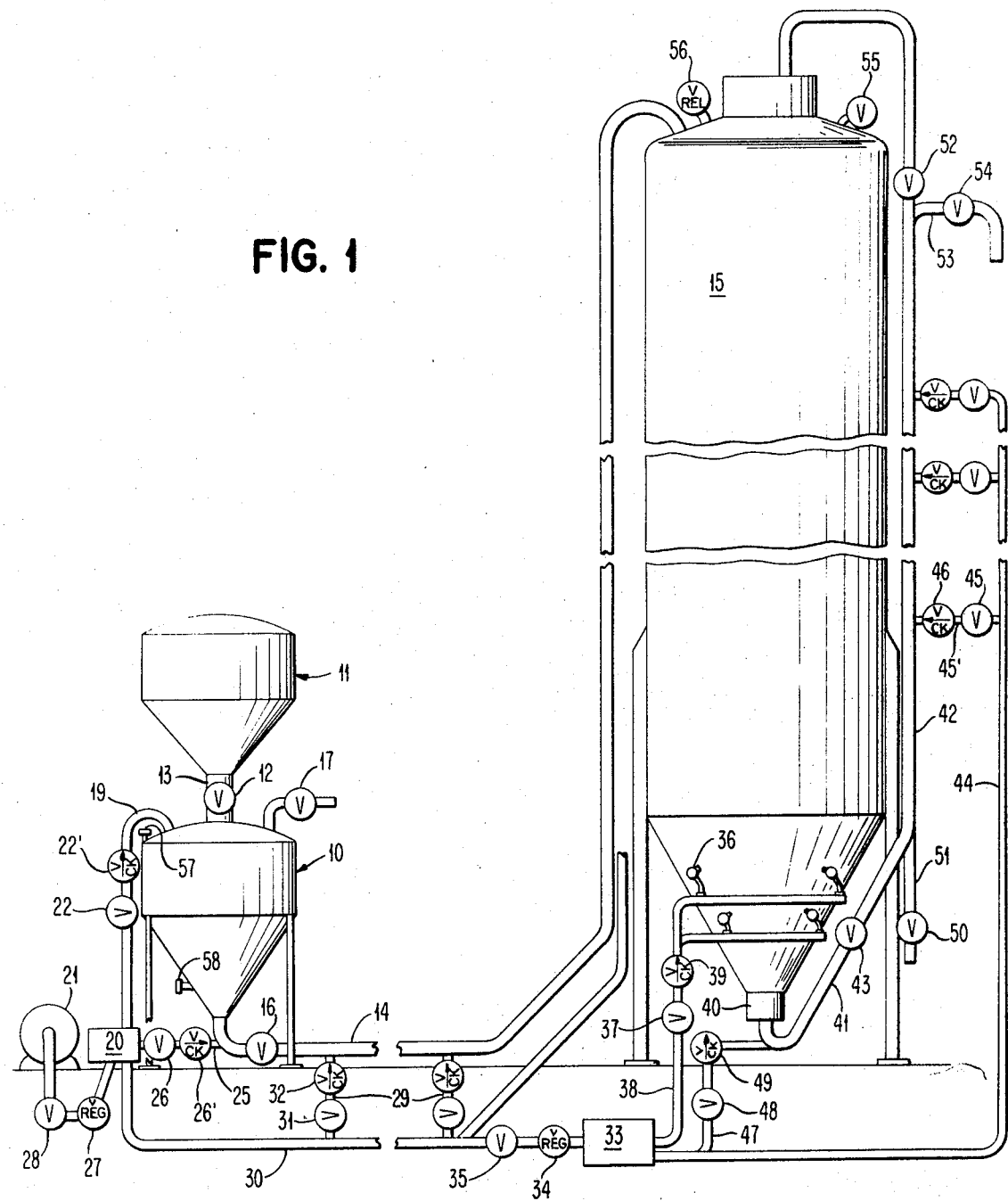
FIG. 1 is a schematic elevational view of one embodiment of the material handling apparatus of the present invention.

Referring to the drawings and particularly FIG. 1, there is shown a fluidizer 10 for receiving material from a source such as a hopper 11, for example. The lower end of the hopper 11 is funnel shaped to direct the material to the fluidizer 10 whenever a valve 12 in a line 13, which connects the outlet of the hopper 11 with the inlet of the fluidizer 10, is open. The valve 12 is preferably pneumatically operated and may be a butterfly or sliding gate valve, for example.

The lower end of the fluidizer 10 is funnel shaped to enable the material to flow therefrom through a line 14 to a storage container or tank 15, which has a capacity at least several times greater than the fluidizer 10 at a minimum. A valve 16, which is preferably pneumatically operated, is disposed within the line 14 to block communication between the fluidizer 10 and the tank 15. The valve 16 may be a butterfly or sliding gate valve, for example.

Whenever the fluidizer 10 is to be filled with material from the hopper 11, a valve 17 at the upper end of the fluidizer 10 is opened while the valve 16 is closed. The valve 17, which is preferably pneumatically operated, vents the fluidizer 10 to the atmosphere whenever the valve 17 is open. The valve 17 may be a butterfly or sliding gate valve, for example.

Figure 2:
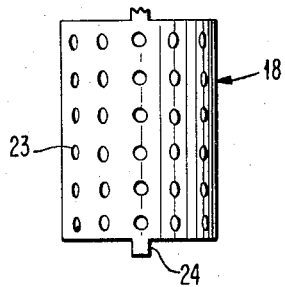
FIG. 2 is an elevational view of an aerator employed with the apparatus of FIG. 1.

After the fluidizer 10 has been filled with the material from the hopper 11, air under a pressure such as 15–30 p.s.i., for example, is introduced into the fluidizer 10 through an aerating cylinder 18 (see FIG. 2), which is disposed within the fluidizer 10 and preferably adjacent the inlet thereof. The cylinder 18 is connected by a line 19 to an air manifold 20, which receives pressurized air from a compressor 21. The cylinder 18 may be supported by the line 19 or by brackets on the inner wall of the fluidizer 10, for example.

The line 19 has a valve 22 therein to prevent or allow flow of air from the manifold 20 to the cylinder 18. The line 19 also has a check valve 22' therein to prevent the flow of any material from the fluidizer 10 to the air manifold 20 whenever the pressure in the fluidizer 10 exceeds the pressure in the air manifold 20 and the valve 22 is open.

The aerating cylinder 18 has a plurality of openings 23 (see FIG. 2) in its periphery and an air outlet 24 in the bottom thereof. The openings 23, which are disposed in substantially parallel rows and substantially parallel columns, allow the air, which is being supplied to the cylinder 18, to be directed into the fluidizer 10 in a plurality of different directions. This prevents the material within the fluidizer 10 from becoming compact and difficult to move.

Pressurized air also is introduced at the same time into the lower portion of the fluidizer 10 through the outlet of the fluidizer 10. The air is supplied to the lower portion of the fluidizer 10 from the air manifold 20 by a line 25. The line 25 introduces pressurized air into the line 14 between the closed valve 16 and the outlet of the fluidizer 10 from which the pressurized air flows into the lower end of the fluidizer 10 to aid in aerating the material within the fluidizer 10.

The line 25 has a valve 26 therein ot prevent or allow flow of air from the manifold 20 to the fluidizer 10. The line 25 also has a check valve 26' therein to prevent flow of material from the fluidizer 10 to the air manifold 20 whenever the pressure within the fluidizer 10 exceeds the pressure in the air manifold 20.

The pressure in the air manifold 20 is controlled by a pressure regulator 27. A valve 28 is disposed between the compressor 21 and the pressure regulator 27 to stop supply of air from the compressor 21 to the air manifold 20. The valve 28 may be a solenoid operated valve, for example.

The pressurized air from the line 25 not only aids in aerating the material within the fluidizer 10 but also aids in transporting the material from the fluidizer 10 through the line 14 to the tank 15 whenever the valve 16 is open. Thus, the pressurized air from the line 25 aids in conveying the material to the tank 15 from the fluidizer 10.

Furthermore, additional connections from the air manifold 20 to the line 14 are employed between the valve 16 and the tank 15 to aid in conveying the material. The desired velocity of the material and its weight determine how many of the additional connections are employed.

Air is supplied to the line 14 between the valve 16 and the tank 15 by lines 29, which connect the line 14 with a line 30 that is connected to the air manifold 20 so as to have pressurized air therein. Each of the lines 29 has a valve 31 therein to control flow of air from the line 30 to the line 14. Each of the lines 29 also has a check valve 32 therein to prevent flow of material from the line 14 to the line 30.

The tank 15 is maintained under a pressure, which is less than the pressure within the fluidizer 10, by air supplied from the compressor 21 to an air manifold 33. The air manifold 33 has its pressure regulated by a pressure regulator 34, which is disposed between the compressor 21 and the air manifold 33. A valve 35 is disposed in the line 30 between the compressor 21 and the pressure regulator 34 to stop flow to the air manifold 33 whenever desired.

The air pressure from the manifold 33 is introduced into the lower portion of the tank 15, which is funnel shaped, through aeration units 36, which may be fittings, for example. A valve 37 in a line 38, which connects the manifold 33 to the aeration units 36, allows or prevents the supply of pressurized air from the manifold 33 to the aeration units 36. The pressurized air aerates the material within the storage tank or container 15 to prevent it from becoming packed. The line 38 also has a check valve 39 therein to prevent flow of the material from the tank 15 to the air manifold 33 if the pressure within the tank 15 should exceed the pressure within the manifold 33.

The tank 15 has its outlet 40 connected through a line 41 to a line 42, which communicates with the upper end of the tank 15 separate from the connection of the line 14. A valve 43, which is preferably pneumatically operated, controls the connection between the outlet 40 of the tank 15 and the line 42. When the valve 43, which may be a butterfly valve, for example, is closed, the line 41 is blocked so that there is no communication of the tank 15 with the line 42.

Whenever the valve 43 is opened to convey material from the tank 15 to the line 42, pressurized air is introduced into the line 42 at one or more points from a line 44 by opening valves 45, which are in lines 45' connecting the line 44 with spaced portions of the line 42, to allow the pressurized air to enter the line 42. A check valve 46 is disposed adjacent each of the valves 45 to prevent flow of material from the line 42 to the line 44 through the line 45'.

Pressurized air also is supplied from the line 44 to the outlet 40 for aiding in conveying the material along the line 41 whenever the valve 43 is opened. Pressurized air is supplied from the line 44 by a line 47, which has a valve 48 therein to allow pressurized air to enter the line 41. A check valve 49 is disposed adjacent the valve 48 to prevent flow from the line 41 to the line 44.

Whenever the valve 43 is opened, a valve 50, which is in a line 51 extending from the line 42, is closed. The valve 50 is opened only when it is desired to supply material directly to the tank 15 from a pneumatic tanker, for example. The valve 50, which is preferably pneumatically operated, may be a butterfly valve, for example.

When the material is flowing from the tank 15 to the line 42, a valve 52 in the line 42 is closed. The valve 52, which is preferably pneumatically operated, may be a butterfly valve, for example. When open, the valve 52 allows the material to flow from the line 42 to the tank 15 when the material is being supplied to the line 42 through the line 51 from the pressurized tanker, for example.

When the valve 43 is open, the material flows from the tank 15 through the line 42 to a discharge line 53, which communicates with a receiving hopper (not shown), for example. The discharge line 53 has a valve 54, which is preferably pneumatically operated, therein to control the flow from the line 42 through the discharge line 53. The valve 54 may be a butterfly valve, for example.

The upper end of the tank 15 has a valve 55, which is preferably pneumatically operated, mounted thereon to vent the tank 15 whenever the valve 55 is open. The valve 55, which may be a butterfly valve, for example, is open whenever it is desired to vent the tank 15 or whenever the valves 50 and 52 are open to allow supply of material to the tank 15 from the pressurized tanker, for example.

Since the valve 55 is closed whenever the fluidizer 10 is supplying material to the tank 15, it is necessary to have some type of means for venting the tank 15 if the pressure should unexpectedly exceed a predetermined safe value. Accordingly, the upper end of the tank 15 has a pressure relief valve 56 mounted therein to relieve the pressure within the tank 15 if the pressure should exceed the predetermined safe value.

Considering the operation of the present invention, the valves 12 and 17 are opened and the valve 16 is closed when material is to be supplied from the hopper 11 to the fluidizer 10. The valves 12, 16, and 17 could be automatically controlled or manually controlled as desired.

The fluidizer 10 has an indicator 57 adjacent its upper end and an indicator 58 adjacent its lower end. The indicators 57 and 58 may be either visual indicators or may be utilized to automatically control the valves 12 and 17. One suitable example of the indicators 57 and 58 is sold as Robert Shaw Tel-Level Indicator Model Number 303.

Thus, when the indicator 57 indicates that the material within the fluidizer 10 due to the flow of material from the hopper 11 has reached a predetermined upper level, the indicator 57 could automatically cause the valves 12 and 17 to close. Likewise, when the indicator 58 indicates that the material in the hopper 11 has reached a predetermined lower level, the valve 16 can be automatically closed.

Upon filling of the fluidizer 10 with material, the valves 12 and 17 are closed. At this time, the valve 22 in the line 19 is opened, either manually or automatically, to allow the pressurized air from the manifold 20 to be supplied to the aerating cylinder 18 to aerate the material within the fluidizer 10. At the same time, the valve 26 in the line 25 is opened to allow the supply of pressurized air to the lower portion of the fluidizer 10 to aid in aerating the material within the fluidizer 10.

After a predetermined time (this is about three to seven seconds), the material in the fluidizer 10 will be sufficiently fluidized to be transported to the tank 15. Accordingly, at this time, the valve 16 is opened, either automatically or manually, while the valves 12 and 17 remain closed. As a result, pressurized air from the line 25 causes the material from the fluidizer 10 to be supplied through the line 14 to the tank 15. Pressurized air also is introduced at this time at the additional points along the line 14 from the manifold 20 by opening the valves 31.

When the tank 15 receives the material from the fluidizer 10, air is being introduced into the tank 15 through the aeration units 36. As a result, the material supplied to the tank 15 is aerated.

When emptying of the fluidizer 10 is completed as indicated by the indicator 58, the valve 16 is closed as are the valve 22 in the line 19 and the valve 26 in the line 25. Likewise, supply of pressurized air to various points along the line 14 from the manifold 20 is stopped by closing the valves 31.

Then, the valve 17 is opened to vent the fluidizer 10. Whenever it is desired to introduce additional material from the hopper 11 into the fluidizer 10, the valve 12 is opened. The process is then repeated to again fill the fluidizer 10. It should be understood that the valve 12 would normally be opened simultaneously with the valve 17 as long as the hopper 11 contained material and it was desired to empty the hopper 11.

Whenever it is desired to remove material from the tank 15, the valves 43 and 54 are opened and the valves 50 and 52 are closed. Furthermore, pressurized air from the manifold 33 is supplied through the line 44 to the line 42 to aid in conveying the material from the tank 15 through the line 42 to the discharge line 53.

The pressure within the tank 15 can be varied between 5 p.s.i. and 15 p.s.i. by the pressure regulator 34. When the pressure in the tank 15 is 5 p.s.i., the pressure in the fluidizer 10 should be at least 10 p.s.i. since the pressure in the fluidizer 10 should be at least twice the pressure in the tank 15. The maximum pressure in the tank 15 is 15 p.s.i.; at this time, the maximum pressure in the fluidizer 10 should be 30 p.s.i. Therefore, when the minimum pressures exist in the fluidizer 10 and the tank 15, the pressure differential is 5 p.s.i. When the maximum pressures exist in the fluidizer 10 and in the tank 15, the differential pressure is 15 p.s.i. between the fluidizer 10 and the tank 15.

Figures 3, 4:
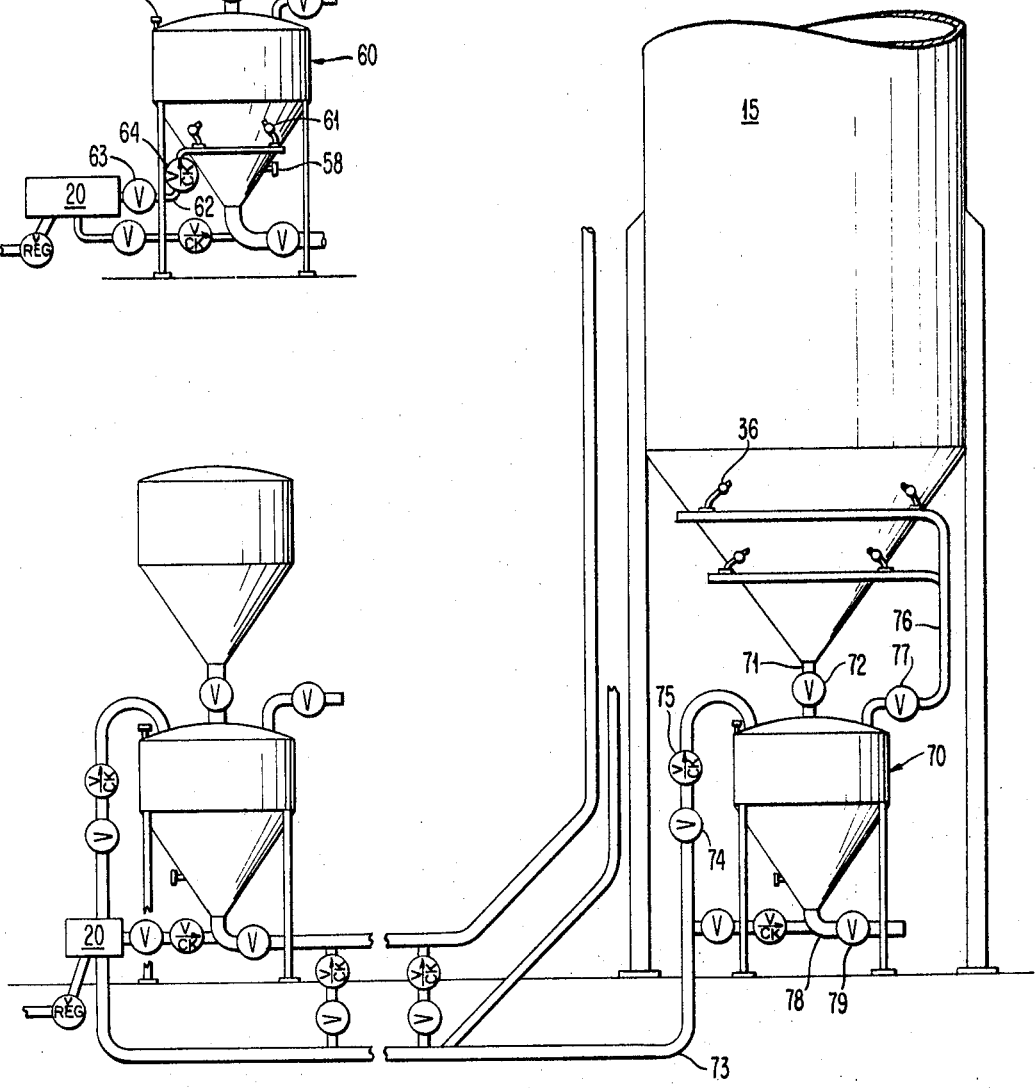
FIG. 3 is a schematic elevational view of another embodiment of the fluidizer for use in the apparatus of FIG. 1.
FIG. 4 is a schematic elevational view of another embodiment of the apparatus of the present invention in which a second fluidizer is utilized to receive the material from the storage tank.

Referring to FIG. 3, there is shown a modification of the present invention in which a fluidizer 60, which is similar to the fluidizer 10, is employed in place of the fluidizer 10. In this embodiment, the line 19 and the aerating cylinder 18 are omitted. Instead, pressurized air is introduced into the funnel shaped portion of the fluidizer 60 by aeration pads 61, which communicate with the manifold 20 through a line 62 having a control valve 63 and a check valve 64 therein for the same purposes as described for the line 19.

The aeration pads 61 are preferably equally angularly spaced about the periphery of the funnel shaped portion of the fluidizer 60. There are preferably four of these pads although any number may be employed. The pads 61 may be fittings, for example.

This arrangement insures that there is aeration of the material just prior to its leaving the fluidizer 60. By using the aeration pads 61 in the lower portion of the fluidizer 60, it is not necessary to utilize the aerating cylinder 18 since sufficient aeration is obtained due to the reduced area of the fluidizer 60 in which the air is introduced.

The remainder of the modification of FIG. 3 operates in the same manner as described for the use of the fluidizer 10 with the tank 15. Therefore, the operation of the fluidizer 60 will not be described.

Referring to FIG. 4, there is shown another form of the invention in which a delivery or second fluidizer 70 is disposed beneath the tank 15 to receive material therefrom by gravity through a line 71. Thus, instead of the material being conveyed from the tank 15 by means of the line 42, the tank 15 communicates directly with the fluidizer 70 through the line 71. A valve 72, which is preferably pneumatically controlled, is disposed in the line 71 to control flow through the line 71. The valve 72 may be a butterfly valve, for example.

The delivery fluidized 70 receives pressurized air from the air manifold 20 by means of a line 73. The line 73 has a valve 74 therein to control the flow of air to the fluidizer 70. There also is a check valve 75 in the line 73 to prevent reverse flow of material from the fluidizer 70 to the manifold 20 if the pressure in the fluidizer 70 should exceed the pressure in the manifold 20. Of course, the fluidizer 70 could have a separate manifold and a separate compressor, if desired.

The tank 15 is not pressurized when the fluidizer 70 is employed. Therefore, the fluidizer 10 can operate at a lower pressure than when the tank 15 is pressurized.

To obtain the desired aeration of the material in the lower portion of the tank 15 prior to its passing from the tank 15 through the fluidizer 70, the upper end of the fluidizer 70 communicates with the aeration units 36 on the tank 15 by a line 76, which has a valve 77 therein. The valve 77 is preferably pneumatically operated and may be a butterfly valve, for example.

When the delivery fluidizer 70 is to be filled, the valve 72 is opened as well as the valve 77. As a result, the material flows from the tank 15 by gravity. Because of the aeration produced in the material in the lower portion of the tank 15 due to the pressure from the fluidizer 70 through the line 76, there is sufficient aeration of the material in the lower portion of the tank 15 to insure that it flows freely by gravity into the fluidizer 70.

The fluidizer 70 is pressurized after the material is supplied thereto from the tank 15. This enables the material within the fluidizer 70 to be aerated when it is within the fluidizer 70. Furthermore, this enables the fluidizer 70 to be pressurized to both deliver the material from the fluidizer 70 and to pressurize the fluidizer 70 for supply of pressurized air to the tank 15 when the valves 72 and 77 are again open.

After the fluidizer 70 is filled, the valves 72 and 77 are closed. Then, the fluidizer 70 receives pressurized air through the line 73 in the same manner as the fluidizer 10 or the fluidizer 60. After the material within the fluidizer 70 has been sufficiently aerated, the material flows therefrom through a line 78 by opening a valve 79 therein. The material flows through the line 78 in the same manner as described for the fluidizer 10. The material can be delivered to either a pressurized or non-pressurized receptacle.

It should be understood that the valves 72 and 77 may be manually or automatically controlled. If the valves are automatically controlled, an indicator within the fluidizer 70 must be actuated when the material within the fluidizer 70 reaches a predetermined level. This would cause the valves 72 and 77 to close.

While air under pressure has been described as the source of the pressurized gas, it should be understood that any suitable gas may be employed if desired. Furthermore, the valves, which have been described as being operated manually or by air, also may be operated by electrical means such as solenoids, for example.

Any type of powdered material may be transported by the material handling apparatus of the present invention. One powdered product is a filler, which is formed of particles capable of passing through a —200 mesh, for use as an additive for asphalt. Other examples of powdered products, which may be transported by the present invention, include concrete, cement, flour, rice, gypsum, asbestos fibers, crushed oyster shells, ground rubber, limestone dust, crushed marble, sand, and salt.

An advantage of this invention is its low initial cost. Another advantage of this invention is that there is no contamination of the conveying lines. A further advantage of this invention is that it reduces the labor cost. Still another advantage of this invention is that there is virtually no maintenance or down time.

For purposes of exemplification, particular embodiments of the invention have been shown and described according to the best present understanding thereof. However, it will be apparent that changes and modifications in the arrangement and construction of the parts thereof may be resorted to without departing from the scope of the invention.

What is claimed is:

1. A closed system for pneumatically conveying particulate material comprising first container means to receive the material from a source, second larger container means, means connecting said first container means to said second container means, means to block said connecting means, means to vent said first container means when said vent means is open, means to control said vent means to cause said vent means to be open to vent said first container means when said first container means is receiving material from the source and said blocking means is effective, first means to aerate the material in said first container means after said first container means ceases to receive the material from the source with said venting means ineffective due to said control means causing said vent means to be closed and said blocking means effective, and means to simultaneously introduce a gas under a selected low pressure into said first container means and said connecting means when said venting means is ineffective due to said control means causing said vent means to be closed and said blocking means is ineffective to direct material from said first container means to said second container means, second aerating means on said second container means, selective means interconnecting said first and second aerating means to selectively aerate material in said first container means and second container means singularly and simultaneously, said first and second container means defining an integrated closed system from the atmosphere under selected low pressure when material is directed from said first container means to said second container means.

2. The system according to claim 1 in which means introduces a gas under a selected low pressure into said second container means separate from said connecting means to maintain said second contained means under a predetermined low pressure at least when said blocking means is ineffective and said simultaneous introducing means introduces the gas into said first container means and said connecting means under a pressure greater than the pressure in said second container means.

3. The system according to claim 2 in which a minimum pressure differential pressure of 5 p.s.i. exists between said first container means and said second container means.

4. The system according to claim 1 in which said aerating means is disposed within said first container means to direct the gas from said introducing means into the material within said first container means.

5. The system according to claim 4 in which said aerating means comprises a cylindrical shaped member having a plurality of openings in its periphery, said openings being disposed in substantially parallel rows and substantially parallel colums.

6. The system according to claim 1 in which said introducing means simultaneously introduces air into said first container means adjacent its inlet that receives the material from the source and its outlet to which said connecting means is connected to aerate the material within said first container means.

7. The system according to claim 1 including third container means, second means connecting said second container means to said third container means to allow the material to flow from said second container means toward said third container means by gravity, second blocking means to block said second connecting means, means to pressurize said third container means when said second connecting means is blocked by said second blocking means, and means to direct the pressurized fluid in said third container means to said second container means when said second blocking means is ineffective to aerate the material in said second container means.

8. A closed system for pneumatically conveying particulate material comprising first container means to receive the material, second container means, means connecting said first container means to said second container means to allow the material to flow from said first container means to said second container means by gravity, means to block said connecting means, means to pressurize said second container means when said connecting means is blocked by said blocking means, means separately interconnecting said first container means and second container means to direct pressurized fluid in said second container means to said first container means when said connecting means is not blocked by said blocking means to aerate the material in said first container means, pressurized means connected to said first container means to deliver material to said first container means, and said first and second container means and pressurized means defining an integrated closed system from the atmosphere when material is being conveyed therebetween.

References Cited

UNITED STATES PATENTS

| | | | |
|---|---|---|---|
| 873,345 | 12/1907 | Canniff | 302—53 |
| 3,149,884 | 9/1964 | Jones | 302—53 |
| 3,189,061 | 6/1965 | Stockel et al. | 302—53 X |
| 3,253,866 | 5/1966 | Bozich | 302—53 |
| 2,594,072 | 4/1952 | Ridley | 302—53 X |
| 3,432,208 | 3/1969 | Hill et al. | 302—53 |
| 2,032,367 | 3/1936 | Kennedy et al. | 302—53 |

EVON C. BLUNK, Primary Examiner

W. S. CARSON, Assistant Examiner

U.S. Cl. X.R.

302—47, 55